(12) United States Patent
Baumeister et al.

(10) Patent No.: US 7,107,351 B2
(45) Date of Patent: Sep. 12, 2006

(54) FILE FUTURES

(75) Inventors: Sascha Baumeister, Stuttgart (DE); Gerd Breiter, Wildberg (DE)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 09/746,190

(22) Filed: Dec. 22, 2000

(65) Prior Publication Data
US 2001/0018702 A1    Aug. 30, 2001

(30) Foreign Application Priority Data
Dec. 30, 1999    (EP) .................... 99126181

(51) Int. Cl.
G06F 15/16    (2006.01)
G06F 15/173    (2006.01)

(52) U.S. Cl. .................... 709/231; 709/203; 709/225; 709/229

(58) Field of Classification Search ................ 709/203, 709/204, 212, 217–219, 227, 231, 232, 238, 709/223, 225, 229
See application file for complete search history.

(56) References Cited

U.S. PATENT DOCUMENTS

| 5,874,986 | A | * | 2/1999 | Gibbon et al. | 725/134 |
| 5,884,056 | A | * | 3/1999 | Steele | 715/738 |
| 5,933,603 | A | * | 8/1999 | Vahalia et al. | 709/225 |
| 6,101,311 | A | * | 8/2000 | Sakamoto | 386/69 |
| 6,151,444 | A | * | 11/2000 | Abecassis | 386/125 |
| 6,192,410 | B1 | * | 2/2001 | Miller et al. | 709/232 |
| 6,195,680 | B1 | * | 2/2001 | Goldszmidt et al. | 709/203 |
| 6,314,466 | B1 | * | 11/2001 | Agarwal et al. | 709/231 |
| 6,339,785 | B1 | * | 1/2002 | Feigenbaum | 709/213 |
| 6,477,704 | B1 | * | 11/2002 | Cremia | 725/35 |
| 6,522,342 | B1 | * | 2/2003 | Gagnon et al. | 715/716 |
| 6,535,909 | B1 | * | 3/2003 | Rust | 709/204 |
| 6,535,911 | B1 | * | 3/2003 | Miller et al. | 709/217 |
| 6,618,758 | B1 | * | 9/2003 | Ubowski | 709/232 |
| 6,625,643 | B1 | * | 9/2003 | Colby et al. | 709/217 |
| 6,633,918 | B1 | * | 10/2003 | Agarwal et al. | 709/231 |
| 6,711,741 | B1 | * | 3/2004 | Yeo | 725/87 |
| 6,807,550 | B1 | * | 10/2004 | Li et al. | 707/201 |
| 6,850,253 | B1 | * | 2/2005 | Bazerman et al. | 715/734 |

* cited by examiner

Primary Examiner—Ario Etienne
Assistant Examiner—Hussein El-chanti
(74) Attorney, Agent, or Firm—John E. Campbell; Floyd A. Gonzalez

(57) ABSTRACT

The present invention relates to a method comprising improvements in transferring large data amounts e.g., large files associated with 'new media' like audio and video data which are streamed through the network. The present invention comprises basically to decouple the transfer and the rendering of data in a way that combines the strength, i.e., the advantages of the streaming paradigm with the flexibility and usability advantages of the store&forward paradigm. This is basically achieved by separating the application logic from the transport logic. The transfer/transport logic is covered by a novel transfer protocol whereas the player application logic can issue standard file access statements like fread, fseek in order to access and render the streamed data.

3 Claims, 2 Drawing Sheets

FILE FUTURES

FIELD OF THE INVENTION

The present invention relates to method and system for transferring data through a computer network. In particular, it relates to improvements in transferring large data amounts e.g., large files.

BACKGROUND OF THE INVENTION

The present inventions is applicable to any situation in which large amounts of data have to be transferred to a computer network. It has particular effects and improvements in the field of streaming 'new media' data such as audio and video data as it is increasingly required in business processes and with increasing acceptance of the Internet.

New media data extends traditional computer data formats into more natural data formats for the interaction of humans and computers by incorporating images, motion pictures, voice, audio, and video. Leading market, business, social, and technical indicators point to the growing importance of this digitally recorded content. Latest in 2003, new media data will eclipse structured data in sheer volume.

One of the key problems with new media data is transferring the usually huge amounts of content through a network. Normally, data is transferred using the store&forward paradigm, e.g. the complete content is transferred before anything is done with the data. A prominent implementation of this paradigm is the File Transfer Protocol (FTP), the standard way to transfer files throughout the World Wide Web.

For conventional data this works fine, as the amounts of data to be transferred are comparably small. For audio and video clips though, the latency time that passes between a request for rendering and the start of the rendering becomes unpractically long.

For this reason, in recent years a second paradigm called streaming has emerged. Streaming allows the rendering of the media to take place in parallel with the transfer of its content, which reduces latency times to a minimum. Streaming software always operates in pairs, a stream server pumping the data continuously through the network and a stream player receiving the data and rendering it.

Unfortunately, the way streaming is performed today has some serious side effects. First of all, the direct coupling of data transfer and doing something with the transferred data makes current streaming technology only available for special purposes, like rendering. Also, there are differences in handling streaming compared to store&forward, like the requirement of providing metafiles instead of the media itself, or different and proprietary security means.

Further, the correlation between stream server and renderer has led to proprietary protocol add-ons being transferred between them two for tactical reasons, practically preventing the player products of manufacturer A to work together with the stream server products of manufacturer B and vice versa.

Further, prior art streaming technology is restricted to stream data which are stored on the same computer device in which the stream server in use is residing. This, however, prevents streaming from being accomplished from any proprietary data server, as e.g., a DB2 database acting as source of the data stream. This reveals a considerable disadvantage as there is thus a practical constraint to store business relevant data on the streamer hardware platform instead on a higher quality computer system with an increased degree of data security.

SUMMARY OF THE INVENTION

It is thus an object of the present invention to alleviate the disadvantages caused by proprietary streamer/player pairs.

The present invention provides for transparently minimizing latency times that come with traditional file transfer in a store&forward manner:

The present invention decouples the transfer and the rendering of media in a way that combines the strength, i.e., the advantages of the streaming paradigm with the flexibility and usability advantages of the store&forward paradigm.

The basic novel principles are referred to herein as 'File Futures' and 'Future FTP' since an application, e.g., a renderer or player of new media data which uses the novel principles can first initiate the transfer of the needed file through a novel method replacing standard FTP and—while the file is being transferred—is enabled to already start working on the "future content" of the file currently being transferred.

This is basically achieved by separating the application logic from the transport logic. The transfer/transport logic is covered by a novel transfer protocol whereas the player application logic can issue standard file access statements like fread, fseek in order to access and render the streamed data.

The present invention provides for two parts, a Future client/server pair providing file transfer services as e.g., like FTP and a Future File System Extension. These two parts communicate via an open interface which is able to be standardized. This implementation of the Future FTP client/server pair and the Future File System Extension can be supplied by different parties.

The Future FTP client/server pair can use streaming technology and/or standard store and forward technology to perform the transfer. If streaming is used though, the necessary additional parameters such as required bandwidth may not show up in the Future FTP client interface. Instead, they can either be provided by a separate system management interface, for example a configuration file, or, they can be determined on the fly by interpreting the source file content. Optional qualities of service such as a bandwidth reservation through the resource reservation protocol (RSVP) can be applied transparently.

The Future FTP client interface follows the standard, and the extension necessary for the interaction with the Future File System Extension is able to be standardized, too.

In contrary to normal, i.e., prior art files, the novel File Futures allow the content of a file to be read while parts of it are still transferred, therefore hiding the fact that the file is not completely available yet. For this reason, a file future knows it's related Future FTP Client instance through a callback interface mechanism.

For the scope of the present invention it is assumed that while the transfer of a future file is in progress no application is allowed to write to that file. Once the transmission is completed the relationship of the Future File System Extension to the Future FTP client for that session is dissolved and later access requests to the transferred file are treated as usual prior art file requests. This implies that write access to that file is allowed from that time on.

The File Future File System Extension provides a mechanism to allow recovery from broken FTP transfers as otherwise an application cannot be sure if a transfer really completed due to it's asynchronous nature. In other words, the Future File System Extension is able to reinitiate transfers in effect to guarantee that a transfer completes successfully.

File Futures are intended as a replacement for all means of FTP file transfer paradigms and have the advantage of transparently minimizing latency times for accessing the required file content. It can therefore be used in all application areas where applications do not work on the complete file content, but instead only use sections of a file at a time. Examples for these kinds of applications are:

Rendering applications like video and audio players. Using the File Future technology will make proprietary stream server products obsolete to a high degree, as all media players can render using standard file access.

CAD/CAM applications profit because they're usually designed in a way to work on smaller portions of a file at a time due to huge size of CAD/CAM files. Therefore, using the novel File Future technology will give CAD/CAM products advantages similar to the advantages which media renderers gain today from using streaming.

The novel technology can be advantageously exploited to integrate proprietary stream servers into an enterprise network.

These and other objects will be apparent to one skilled in the art from the following drawings and detailed description of the invention.

BRIEF DESCRIPTION OF THE DRAWINGS

The present invention is illustrated by way of example and is not limited by the shape of the figures of the accompanying drawings in which.

DESCRIPTION OF THE PREFERRED EMBODIMENT

Figure 1:
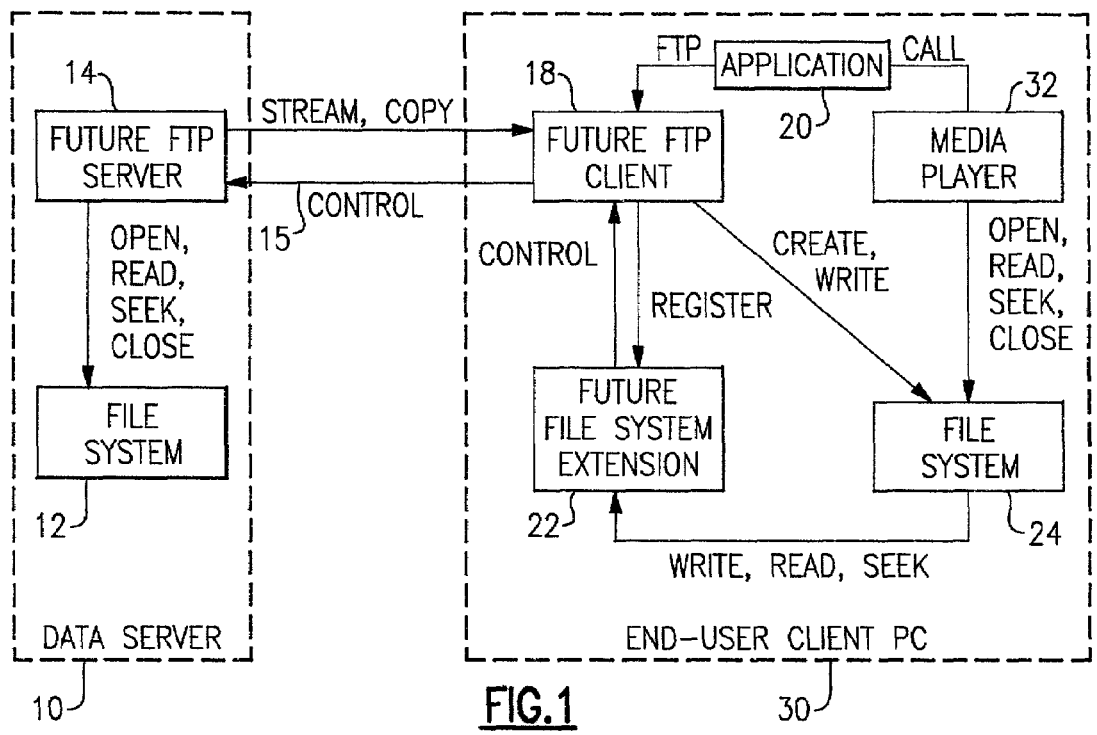
FIG. 1 is a schematic block diagram showing the most essential elements in a distributed system which is used for the present invention according to one preferred aspect thereof as well as the basic activities during the novel client-server file transfer method.

With general reference to the figures and with special reference now to FIG. 1 a preferred basic configuration according to a first preferred aspect of the present invention depicted in FIG. 1 is described in more detail.

An insurance company has a data server 10 using a conventional file system 12 in order to store business-relevant data. Some of the data is stored in form of video films consuming large amounts of bytes as, e.g., several hundreds of megabytes. Said data server 10 is connected to a novel server transfer component 14 and a high speed data transmission line 15 connecting to a number of client computer systems one of which is depicted with reference sign 30. The client computer system is now assumed to be a PC associated to some staff of said insurance company, acting as an end-user with reference to the present invention's file transfer and rendering method.

Said novel server software component 14 acts as a sender component for transferring files of the file system 12 to said predetermined client target computer systems 30. As said component 14 forms part of the novel file future concepts it is referred to herein as future FTP server and will be abbreviated as FFTP server 14.

On the client computer side according to some basics of the novel concepts there is implemented an additional program component which cooperates with the end-user PC's file system 24 and acts as a file system extension 22. As said additional software component is concerned with the novel provision of the above mentioned file futures said component 22 is referred to herein as Future File System Extension and abbreviated as FFSE. As it will be described in more detail below said file system extension helps to decouple the file access operations from the file transfer operation. Said FFSE component 22 is arranged to cooperate with a further novel software component 18.

Said component 18 acts as a file transfer client program. As it forms part of the novel file future concepts it is referred to herein as Future FTP client and abbreviated herein as FFTP client. In particular, said FFTP client 18 acts as a receiver program for files which are transferred from the future FTP server 14 associated with the data server 10 mentioned above.

Further, said end-user PC is provided with a player program 32 which is capable to render video data and/or audio data which is received from the FFTP server 14.

When the end-user associated with PC system 30 wants to render data on his PC, the data, however, residing in the remote data server 10 he initiates an inventive file transfer with some initializing work, issues a 'traditional' file access command to his file system by the media player like 'read' and 'seek' and will be able to render the data although the transfer has not yet being completed. In particular, according to the present invention all file access commands as they are in particular read and seek commands are issued by the player 32 via an input to the file system 24 to the FFSE component 22 for being handled in cooperation with the FFTP client 18 and FFTP server components 14.

Figure 2:
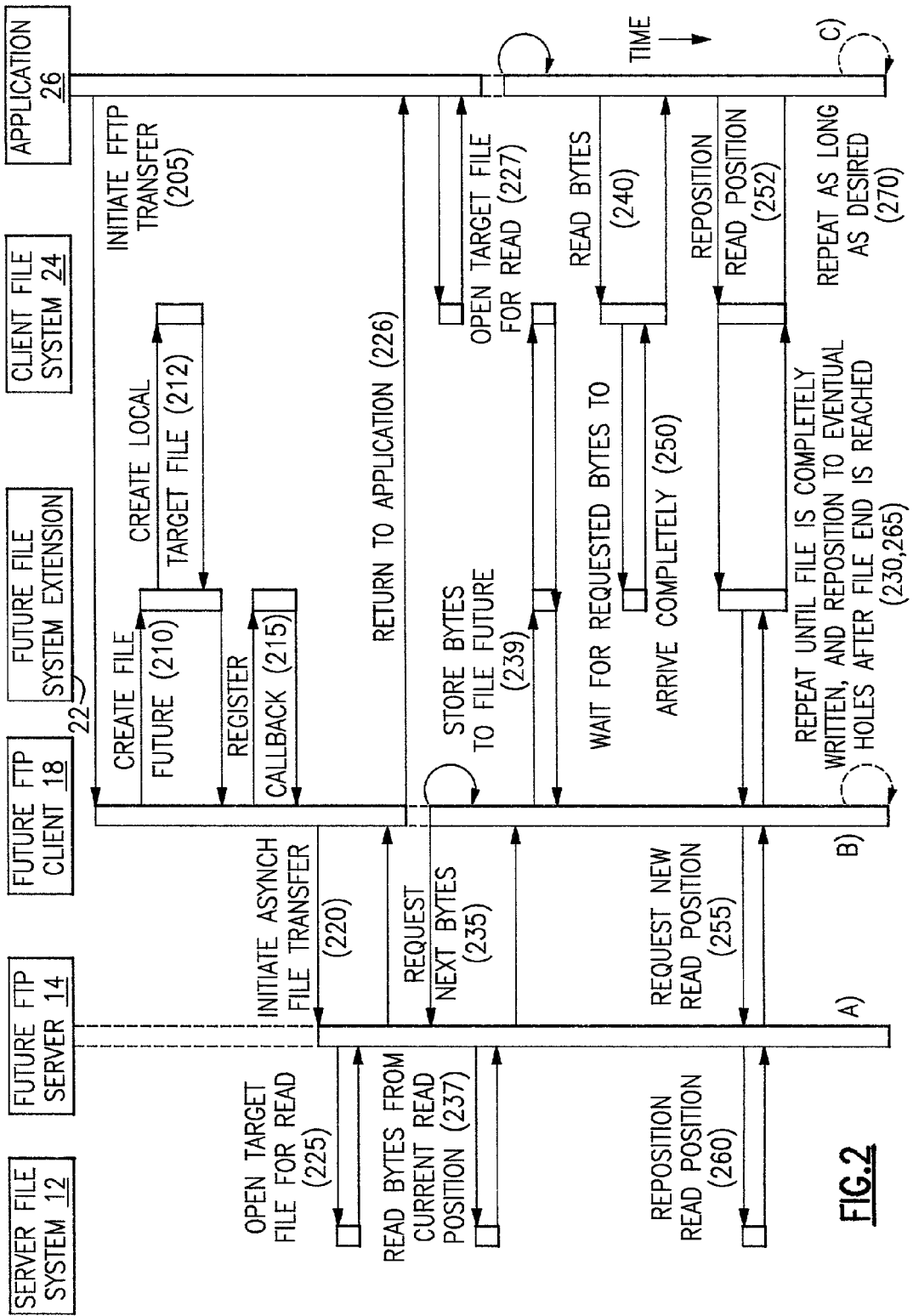
FIG. 2 is a so-called Unified Modeling Language (UML) Sequence Diagram showing the most essential steps and the most essential processes operating in parallel of the overall control flow according to one aspect of the novel file transfer method.

For more detail additional reference should now be made to FIG. 2 which is a so-called Unified Modeling Language (UML) Sequence Diagram showing the parallel cooperation between the three essential components of the novel method, as they are the application 20, the FFTP client 18, and the FFTP Server 14. Time increases from top to down. Circle-like arrows are symbols indicating the beginning and the end of a loop, respectively.

As it is recognizable at the first glance the novel method starts user-initiated by an application call (top right corner) followed by some initialization work performed by the FFTP client 18 and then splits up into three parallel activities symbolized with a respective time column where the left most column mostly operates when requested by the FFTP client until it is terminated by the end-user, again, which is not depicted explicitly.

In particular, said application 20 first initiates a Future FTP transfer, passing the file name of the remote source file and the file name of the local target file to the FFTP client 18. This can be done in the same syntax as in standard FTP, step 205.

Then, in a step 210 said FFTP client 18 creates a file future, i.e., calls the FFSE component 22 to create a local target file within the client file system 24. For doing that a prior art file creating command like 'fopen' with 'create' attributes set is used.

For improved clarity, it should be noted that the terms 'file future' and 'target file' refer to the same physical data object which is in deed a prior art file as an element of a file system. Those two different terms are used, however, in order to disclose the real core of the present invention to handle a file with prior art file access commands transparent to the application while the file is not yet 'complete' and therewith ready to be accessed in prior art technology.

Then, in a step 215, the FFTP client registers a prior art callback with the help of the novel Future to File System Extension for the control flow to be expected, e.g., via passing a process ID or a port number to the FFSE.

Thereafter, it initiates the asynchronous transfer of the file content with the Future FTP server, step 220. In response thereto, the FFTP server component 14 opens the source file for read access, step 225 which results in the requested bytes being transferred over the network. Finally, the application FFTP client call returns to the application, step 226.

Then, application 20 for example calls a media player 32 which opens the target file, step 227, and is able to access them, i.e. to render it while it is still being transferred. In general, the user-initiated file access calls like 'fread' and 'fseek' received by the file system 24 are routed to the novel Future File System Extension 22 for special behavior.

This can generally be realized for example by the technique of stacking file systems or using the XDSM technology. Further, it is possible to enrich the code of a file system which is open to application programmers as it is e.g., the LINUX file system with a kind of wrapper logic which implements the above described mechanism, i.e., to catch the relevant file access commands issued by the application and to route it to the FFTP client for further processing, or simply pass it to another FFTP process running in the same computer device or, in general, to any location as it is required for the actual streaming process.

Thus, in a step 235 the FFTP client requests the next bytes to be transferred from the FFTP server. This request is satisfied by the FFTP server component 14 by reading from the server file system 12 from let's say the current read position, step 237. Those bytes are stored to the file future, step 239, and the application is able to read it from the target file, step 240. When data is already received from the network it can be rendered, and if not yet—it waits until it is arrived completely, step 250. In a manner like that an end-user can for example display a video clip from its actual beginning on his screen.

As long as the whole file transfer, i.e., the whole video clip transfer between said FFTP server component 14 and the FFTP client 18 is not yet completed, as it can generally be the case with a large amount of data to be transferred the novel concept depicted in the center and lower part of FIG. 2 provides for 'random access' of data while the data requested before is still being transferred.

In a step 252, for example, the end-user may wish to skip a certain portion of the video clip because he is not interested in watching it. Thus, it is assumed that he jumps to the middle portion of the video clip and operates the media player 32 installed on his PC correspondingly. A file read access request comprising an instruction to reposition the read position in the source file at the server 12 corresponding to the player operation command is thus input to the file system. There it is caught by the FFSE component 22 in order to forward it—step 255—via the FFTP client 18 to the FFTP server component 14. Thus, the read position for reading the source file of the video clip is actually repositioned in a step 260 and the data stream is continued beginning with the desired new position.

Of course, this means that the file pointer on the target file system at the client PC 30 is also repositioned to the new location which generally will result in "holes" in the target file.

If the filling of the holes is desired as it is expected to be in most cases this can be handled by the FFTP client 18 by recursively filling them automatically once it has transferred to the file end, step 265. This way of proceeding, i.e., sequentially streaming and concurrently rendering the client-requested data while being ready for promptly serving any end-user requested jumps to a newly preferred read position may be continued as long as desired by the end-user, step 270.

Thus, the present invention provides for a very effective media player operation in which the end-user is provided with a quick random access to the desired data.

According to the preferred novel embodiment shown in FIG. 1 and the flow of operation shown in FIG. 2 any prior art stream server becomes obsolete which saves costs and has the effect that the data to be rendered at the end-user PC 30 may be transferred directly from the data server 10 through the network to the end-user PC 30. Thus, the data need not to be present physically at any third location in the network which is of special interest when business-critical data is to be rendered. Further, any player program can be used with this approach as the novel File Future concept can be implemented offering an open standard covering all players being commercially available. Thus, the disadvantageous effects of prior art required proprietary pairs of stream server/player are eliminated.

Figure 3:
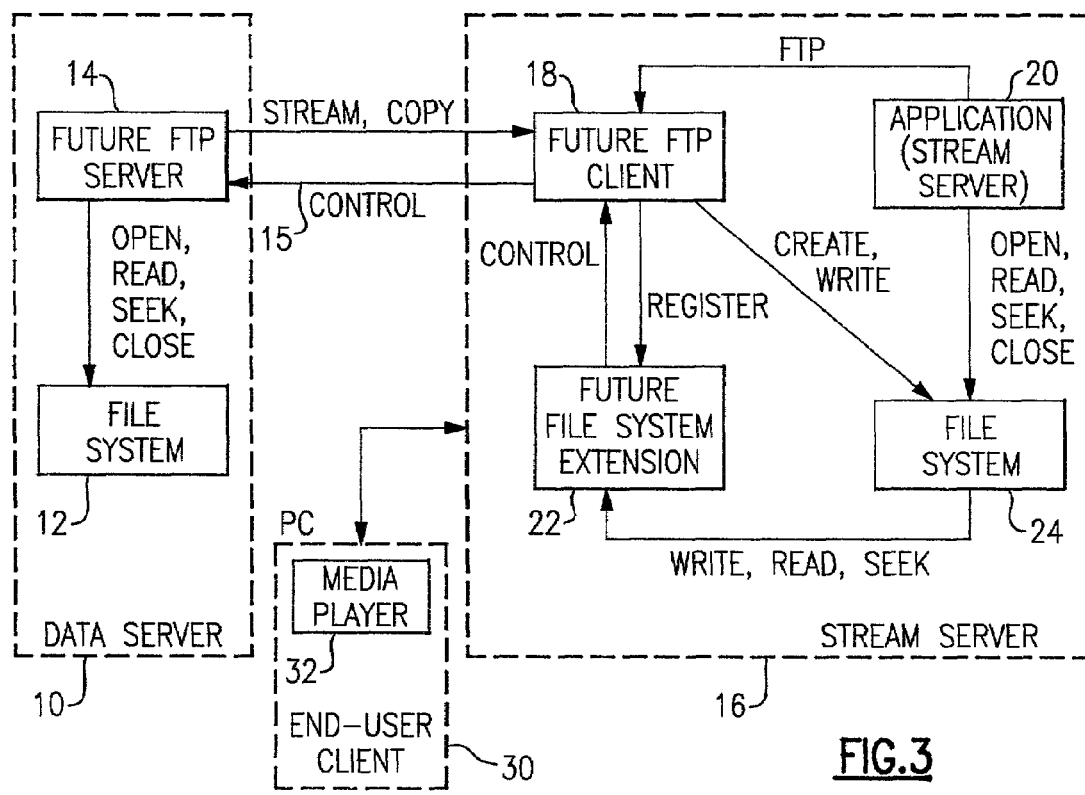
FIG. 3 is a schematic block diagram of a variation of FIG. 1, showing a system structure which is also able to be realized according to a second preferred aspect of the novel file transfer method.

With reference now to FIG. 3 which is a schematic block diagram illustrating a variation of FIG. 1 a further system structure which is also able to be realized according to a second preferred aspect of the novel file transfer and rendering method will be described in more detail.

The special interest of this embodiment is that the basic configuration forming a kind of 'triangle' and comprising a data server 10, a stream server 16, and an end-user client PC requesting and rendering the new media data can be found very often in today's business environments, as well as in situations in which an Internet user wants to render new media data.

The same reference numerals describe the same or functionally equivalent elements as described already before with reference to FIG. 1. Thus, it should be referred to the corresponding description of FIG. 1 where appropriate.

In contrast to FIG. 1 the personal computer 30 acts in FIG. 3 as an end-user client in relation to a prior art stream server 16 which comprises a dedicated stream server application program component 20 in order to cooperate with a corresponding client side media player program 32 which is capable to render video data and/or audio data received from the stream server 16. The end-user operates the media player application 32 which thus issues corresponding file access commands to the application stream server component 20 across the network. Then, the application stream server component 20 in turn plays the same role which the media player had in the embodiment described with reference to FIG. 1. Thus, the end-user client PC renders media data streamed twice in the network: first from the data server 10 to the stream server 16 via, for example, a high speed connection line 15, and second, from the application stream server 16 to the client 30.

In general, the novel File Future principles can be positioned to both streaming technology and store&forward technology. Compared to streaming technology, File Futures have the advantage to be absolutely transparent to the application. In other words, the application still works on a strict file paradigm basis and does not need to be reprogrammed to be enabled to know that the complete file is not available at the time it tries to access it.

Compared to traditional store&forward technology, the novel File Futures have the advantage to minimize the latency time, which is a use inhibitor for store&forward mechanisms when large files are transferred. In effect this means that the novel concepts of File Futures combine the strength, i.e., the advantages of both paradigms, streaming and store&forward.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

For example, a temporary buffer could be used as an intermediate stage to store the freshly streamed/transferred data temporarily and keep them stored until they were copied into the target file and/or until they were rendered by the client PC. Thus, the target file would be decoupled from the streaming process, and could be built asynchronously with the data transfer progress achieved by streaming or by burst transmission and store&forward technology.

The novel approach described above can be advantageously combined with the natural 'inner' structure of many data sources having huge contents, like books comprising many images, photo catalogues, music pieces, films or large business data files in for example banking or CAD applications which often use a table of contents for the user to navigate quickly in the data. Thus, the end-user will often have the possibility to first see the table of contents for a selection of the desired data. Then a file access command like the above described 'seek' will usually follow—and will be supported according to the present invention with minimized latency. Basically the same can be done with a conventional table of indexes, as well.

Thus, the present invention represents a large step forward for improving the performance of sessions in the World Wide Web where in many cases the user's strongest desire is to retrieve quickly what he searches for.

The present invention can be realized in hardware, software, or a combination of hardware and software. A Future File Transfer and/or Rendering tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the client or server specific steps of the methods described herein.

The present invention can also be embedded in a computer program product, which comprises all the features enabling the implementation the respective steps of the methods described herein, and which—when loaded in one or more computer systems—is able to carry out these methods.

Computer program means or computer program in the present context mean any expression, in any language, code or notation, of a set of instructions intended to cause a system having an information processing capability to perform a particular function either directly or after either or both of the following; (1) conversion to another language, code or notation, or (2) reproduction in a different material form.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for transferring remote files from a remote server to a local client, the method comprising the steps of:

receiving at the local client a portion request from a local portion requestor to retrieve all portions of a remote file from the remote server to a local file at the local client, the remote file having one or more first portions preceding a second portion, the portion request comprising information specifying the second portion of the remote file;

determining the status of portions received from the remote file from the remote server at the local file of the local client;

responsive to the portion request, when the status of the portions received from the remote server indicates that the second portion has not been received from the remote server and stored at the local file and when one of the one or more first portions has net yet been received from the remote file from the remote server, initiating from the local client the retrieval of all not yet retrieved portions from the remote server beginning with the second portion of the remote file from the remote server to the local file;

when the status of the portions received from the remote server indicates that the second portion has been received from the remote server and stored at the local file and when one of the one or more first portions has not yet been received from the remote file from the remote server, initiating from the local client the retrieval of all not yet retrieved portions from the remote server to the local file; and when a portion of the all portions of the remote file have been received from the remote server and stored at a portion of the local file, making the portion of the local file available to the portion requester.

2. A system for downloading remote files from a remote server to a local client, the system comprising:

a network;

a remote computer system;

a local computer system in communication with the remote computer system via the network wherein the computer systems includes instructions to execute a method comprising the steps of:

receiving at the local client a portion request from a local portion requester to retrieve all portions of a remote file from the remote server to a local file at the local client, the remote file having one or more first portions preceding a second portion, the portion request comprising information specifying the second portion of the remote file;

determining the status of portions received from the remote file from the remote server at the local file of the local client;

responsive to the portion request, when the status of the portions received from the remote server indicates that the second portion has not been received from the remote server and stored at the local file and when one of the one or more first portions has not yet been received from the remote file from the remote server, initiating from the local client the retrieval of all not yet retrieved portions from the remote server beginning with the second portion of the remote file from the remote server to the local file;

when the status of the portions received from the remote server indicates that the second portion has been received from the remote server and stored at the local file and when one of the one or more first portions has not yet been received from the remote file from the remote server, initiating from the local client the retrieval of all not yet retrieved one or more first portions from the remote server to the local file; and when a portion of the all portions of the remote file from the remote server have been received from the remote server and stored at a portion of the local file, making the portion of the local file available to the portion requester.

3. A computer program product for downloading remote files from a remote server to a local client, the computer program product comprising:

a storage medium readable by a processing circuit and storing instructions for execution by a processing circuit for performing a method comprising the steps of:

receiving at the local client a portion request from a local portion requester to retrieve all portions of a remote file from the remote server to a local file at the local client, the remote file from the remote server having one or more first portions preceding a second portion, the portion request comprising information specifying the second portion of the remote file;

determining the status of portions received from the remote file from the remote server at the local file of the local client;

responsive to the portion request, when the status of the portions received from the remote server indicates that the second portion has not been received from the remote server and stored at the local file and when one of the one or more first portions has not yet been received from the remote file from the remote server, initiating from the local client the retrieval of all not yet retrieved portions from the remote server beginning with the second portion of the remote file from the remote server to the local file;

when the status of the portions received from the remote server indicates that the second portion has been received from the remote server and stored at the local file and when one of the one or more first portions has not yet been received from the remote file from the remote server, initiating from the local client the retrieval of all not yet retrieved one or more first portions from the remote server to the local file; and when all portions of the remote file have been received from the remote server and stored at the local file, making the portions of the local file available to the portion requester.

* * * * *